(12) United States Patent
Zhang et al.

(10) Patent No.: US 12,128,775 B1
(45) Date of Patent: Oct. 29, 2024

(54) MULTI-CONSTRAINT OPTIMAL DISTRIBUTION METHOD FOR TORQUE VECTORING OF DISTRIBUTED DRIVE ELECTRIC VEHICLE

(71) Applicant: TONGJI UNIVERSITY, Shanghai (CN)

(72) Inventors: Lin Zhang, Shanghai (CN); Hong Chen, Shanghai (CN); Haobo Sun, Shanghai (CN); Hanghang Liu, Shanghai (CN); Wei Pan, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/540,734

(22) Filed: Dec. 14, 2023

(30) Foreign Application Priority Data

Jun. 20, 2023 (CN) .......................... 202310734337.4

(51) Int. Cl.
*B60L 3/10* (2006.01)
*B60L 15/20* (2006.01)

(52) U.S. Cl.
CPC .......... *B60L 3/106* (2013.01); *B60L 15/2036* (2013.01); *B60L 2240/22* (2013.01); *B60L 2240/24* (2013.01); *B60L 2240/423* (2013.01); *B60L 2240/461* (2013.01); *B60L 2240/463* (2013.01); *B60L 2240/465* (2013.01)

(58) Field of Classification Search
CPC .. B60L 3/106; B60L 15/2036; B60L 2240/22; B60L 2240/24; B60L 2240/423; B60L 2240/461; B60L 2240/463; B60L 2240/465
See application file for complete search history.

(56) References Cited

U.S. PATENT DOCUMENTS

| | | | |
|---|---|---|---|
| 8,521,349 B2* | 8/2013 | Yu ........................ | B60W 10/08 701/22 |
| 2021/0046922 A1* | 2/2021 | Su ......................... | B60W 40/12 |
| 2023/0117280 A1* | 4/2023 | Wang ...................... | F16H 1/46 475/5 |
| 2024/0010036 A1* | 1/2024 | Dhaens ................... | B60D 1/62 |
| 2024/0131877 A1* | 4/2024 | De Pinto ............... | B60W 50/14 |

\* cited by examiner

*Primary Examiner* — Donald J Wallace
(74) *Attorney, Agent, or Firm* — Bochner PLLC; Andrew D. Bochner

(57) ABSTRACT

The present disclosure relates to a multi-constraint optimal distribution method for a torque vectoring of a distributed drive electric vehicle, which includes: obtaining a vehicle real-time motion state, taking a pre-constructed tire rotation dynamics model as a control object of an optimal distribution problem, establishing an objective function for tracking a desired additional yaw moment, tracking a desired tire slip ratio, and suppressing a motor output energy consumption to a minimum value, establishing a corresponding system constraint, solving the optimal distribution problem, and obtaining an optimal distribution solution for a torque vectoring of each tire. Compared with the prior art, the present disclosure can effectively track a desired control target, can also effectively constrain an important state and a control input of the vehicle, and can avoid wrong solutions or no solution caused by an optimization problem.

9 Claims, 9 Drawing Sheets

MULTI-CONSTRAINT OPTIMAL DISTRIBUTION METHOD FOR TORQUE VECTORING OF DISTRIBUTED DRIVE ELECTRIC VEHICLE

CROSS REFERENCE TO RELATED APPLICATION

This patent application claims the benefit and priority of Chinese Patent Application No. 2023107343374, filed with the China National Intellectual Property Administration on Jun. 20, 2023, the disclosure of which is incorporated by reference herein in its entirety as part of the present application.

TECHNICAL FIELD

The present disclosure relates to the technical field of control over distributed drive electric vehicles, in particular to a multi-constraint optimal distribution method for a torque vectoring of a distributed drive electric vehicle.

BACKGROUND

Four hub motors of a four-wheel distributed drive electric vehicle can individually output drive/brake moments with a super-high degree of control redundancy, which allows for a flexible, fast and accurate torque response and is a significant method for improving the driving safety of the vehicle. The size of the driving/braking moments output from the four hub motors is adjusted through torque vectoring distribution, so the vehicle obtains an additional yaw moment. Therefore, the maneuverability and the driving stability of the vehicle can be effectively improved, which is of great significance for protecting the safety of a driver in hazardous situations. However, existing torque vectoring distribution methods for four-wheel distributed drive electric vehicles have the following problems:

1. Torque vectoring distribution of a four-wheel distributed drive vehicle regulates a tire force to track a desired additional yaw moment by applying additional torque to hub motors, so as to adjust a driving attitude of the vehicle to maintain the maneuverability and the stability of the vehicle. Owing to the highly dynamic and nonlinear features of a tire force of a vehicle, existing rule-based torque distribution methods routinely fail to produce optimal control results. Therefore, an optimization-based distribution method for a torque vectoring of a distributed drive electric vehicle should be used.

2. When a torque vectoring control distribution solution is designed, emphasis should be placed on the constraints on important state of the system, such as a limit on a slip ratio, in order to avoid the vehicle instability brought by tire skidding in the control process. Constraints on control input should also be considered, such as a limit on a tire additional moment, limits on the total four-wheel additional torque, etc., to avoid excessive interference with driving of a driver caused by the additional torque applied. Existing optimal distribution solutions based on tire adhesion use ratio can hardly deal with the above types of constraints directly and explicitly.

3. When a multi-constraint optimal distribution problem for a torque vectoring is solved, the application of various constraints can maintain the state and the control input of the system in a reasonable range, but this also reduces a range of feasible solutions, which will lead to wrong solutions or no solution in serious cases. Moreover, in some extreme cases, in order to ensure driving safety of a vehicle, strict constraints need to be imposed on the state or the control input, which may also lead to wrong solutions or no solution to the optimization problem. The wrong solutions or no solution to the optimization problem in the distribution problem for the torque vectoring will seriously affect the driving safety of the vehicle, but none of the existing optimal distribution solutions for the torque vectoring involves how to deal with such wrong solutions or no solution to the optimization problem.

SUMMARY

An objective of the present disclosure is to overcome the defects of the prior art and provide a multi-constraint optimal distribution method for a torque vectoring of a distributed drive electric vehicle, so as to accurately track a desired control target.

The objective of the present disclosure can be achieved by the following technical solution.

A multi-constraint optimal distribution method for a torque vectoring of a distributed drive electric vehicle includes:

obtaining a vehicle real-time motion state, taking a pre-constructed tire rotation dynamics model as a control object of an optimal distribution problem, establishing an objective function for tracking a desired additional yaw moment, tracking a desired tire slip ratio, and suppressing a motor output energy consumption to a minimum value, establishing a corresponding system constraint, solving the optimal distribution problem, and obtaining an optimal distribution solution for a torque vectoring of each tire.

Further, a calculation expression of the objective function is as follows:

$$J = J_1 + J_2 + J_3$$

$$J_1 = \sum_{i=1}^{n} \Phi_1 \|\Delta M_z(k+i-1) - \Delta M_z^*\|^2$$

$$\Delta M_z = \Omega(\Delta T_1, \Delta T_2, \Delta T_3, \Delta T_4)$$

$$J_2 = \sum_{i=1}^{n} \sum_{j=1}^{4} \Phi_2 \|\lambda_j(k+i-1) - \lambda_j^*(k+i-1)\|^2$$

$$\lambda_i = \Lambda(\omega_i, V_{xi}, R_e)$$

$$V_{xi} = h(V_x, V_y, \gamma, \delta_f, L_f, L_r, d)$$

$$J_3 = \sum_{i=1}^{n} \Phi_3 \|u(k+i-1)\|^2$$

where J is the objective function, $J_1$ is a function for tracking the desired additional yaw moment, $J_2$ is a function for tracking the desired tire slip ratio, $J_3$ is a function of the motor output energy consumption, $\Phi_1$ is a weight coefficient of the function $J_1$, $\Delta M_z^*$ is the desired additional yaw moment, $\Delta M_z$ is an actual additional yaw moment generated by a control input, $\Omega$ is a function relationship representation symbol, $\Delta T_1$, $\Delta T_2$, $\Delta T_3$, $\Delta T_4$ are tire additional torque of a left front wheel, a right front wheel, a left rear wheel, and a right rear wheel respectively, k is a current time, n is a predictive horizon, $\Phi_2$ is a weight coefficient of the function $J_2$, $\lambda^*$ is a desired slip ratio sequence, j is a tire number, $\Lambda$ is a function relationship representation symbol, $\omega_i$ is a tire rotation velocity at an i time, $V_{xi}$ is a longitudinal velocity at a center of each tire, $R_e$ is an effective rotation radius of each tire, $V_x$ is a longitudinal velocity of the vehicle, $V_y$ is a lateral velocity of the vehicle, y is a yaw rate of the vehicle, $\delta_f$ is a front wheel angle, $L_f$, $L_r$ are distances from a center of mass to a front axle and a rear axle respectively, d is a wheel track of the vehicle, h is a function relationship representation symbol, $\Phi_3$ is a weight coefficient of the function $J_3$, and u(k+i−1) is tire additional torque at a k+i−1 time.

Further, the system constraint includes a constraint limit on an important system state and a constraint limit on a system control input to be optimized.

Further, the constraint limit on an important system state includes a slip ratio constraint, and an expression of the slip ratio constraint is as follows:

$$\lambda_{low} \leq \lambda \leq \lambda_{up}$$

where $\lambda$ is a slip ratio vector, $\lambda_{low}$ is a lower limit value vector of a tire slip ratio, and $\lambda_{up}$ is an upper limit value vector of the tire slip ratio.

Further, the constraint limit on a system control input to be optimized includes a tire additional torque constraint and a total additional torque constraint, and an expression of the tire additional torque constraint is as follows:

$$u_{low} \leq u \leq u_{up}$$

where u is the tire additional torque, $u_{low}$ is a lower limit value of the tire additional torque, and $u_{up}$ is an upper limit value of the tire additional torque; and the total additional torque constraint is that total additional torque falls within a corresponding range from an upper limit to a lower limit.

Further, in a process of solving the optimal distribution problem, priority of the constraint limit on a system control input to be optimized is set higher than priority of the constraint limit on an important system state.

Further, in a process of solving the optimal distribution problem, the method further introduces a slack variable as an additional control input, and an expression of the slack variable is as follows:

$$\epsilon = [\epsilon_1, \epsilon_2, \epsilon_3, \epsilon_4]^T$$

where $\epsilon$ is a slack variable sequence, and $\epsilon_1$, $\epsilon_2$, $\epsilon_3$, $\epsilon_4$ are slack variables of a left front wheel, a right front wheel, a left rear wheel and a right rear wheel respectively;

a slip ratio constraint is modified according to the slack variable, and an expression of a modified slip ratio constraint is as follows:

$$\lambda_{low} - \epsilon \leq \lambda \leq \lambda_{up} + \epsilon$$

where $\lambda$ is a slip ratio vector, $\lambda_{low}$ is a lower limit value vector of a tire slip ratio, and $\lambda_{up}$ is an upper limit value vector of the tire slip ratio; and a control input sequence obtained by solving the optimal distribution problem is as follows:

$$\bar{u} = [\Delta T_1, \Delta T_2, \Delta T_3, \Delta T_4, \epsilon_1, \epsilon_2, \epsilon_3, \epsilon_4]^T$$

where $\Delta T_1$, $\Delta T_2$, $\Delta T_3$, $\Delta T_4$ are tire additional torque of the left front wheel, the right front wheel, the left rear wheel and the right rear wheel respectively.

Further, the slack variable corresponds to a slack variable constraint, and an expression of the slack variable constraint is as follows:

$$0 \leq \epsilon \leq \epsilon_{max}$$

where $\epsilon_{max}$ is an upper limit value of the slack variable.

Further, an expression of the tire rotation dynamics model is as follows:

$$\dot{\omega}_i = \frac{1}{I_w}(-F_{xi} R_e + T_i)$$

where subscripts i=1,2,3,4 represent a left front wheel, a right front wheel, a left rear wheel and a right rear wheel respectively; $\omega$ is a tire rotation velocity; T is total torque applied to the tires and is calculated as $T = T_d + \Delta T$, where $\Delta T$ is tire additional torque, and $T_d$ is a drive moment or a brake moment applied by a driver; $F_x$ is a tire longitudinal force, and $R_e$ is an effective rotation radius of each tire; and $I_\omega$ is a moment of inertia of the tire.

Further, known quantities in a process of solving the optimal distribution problem include a front wheel angle, a drive moment or a brake moment applied by a driver, a desired additional yaw moment, and a desired tire slip ratio.

Compared with the prior art, the present disclosure has the following advantages:

(1) The multi-constraint optimal distribution method for a torque vectoring in the present disclosure can effectively track a desired control target, and can also effectively constrain an important state and a control input of the vehicle. The priority of the constraints is graded by increasing the slack variable, such that wrong solutions or no solution caused by an optimization problem is avoided effectively.

(2) According to the method, a receding horizon optimal control problem is constructed directly based on a tire rotation dynamics model, various constraints are uniformly transformed into constraints on a control input, and the priority of the constraints is graded from low to high through a method for constructing the slack variable. On the premise of strictly satisfying a higher-level constraint, a lower-level constraint is released to a certain extent, such that wrong solutions or no solution is avoided.

DETAILED DESCRIPTION OF THE EMBODIMENTS

Figure 1:
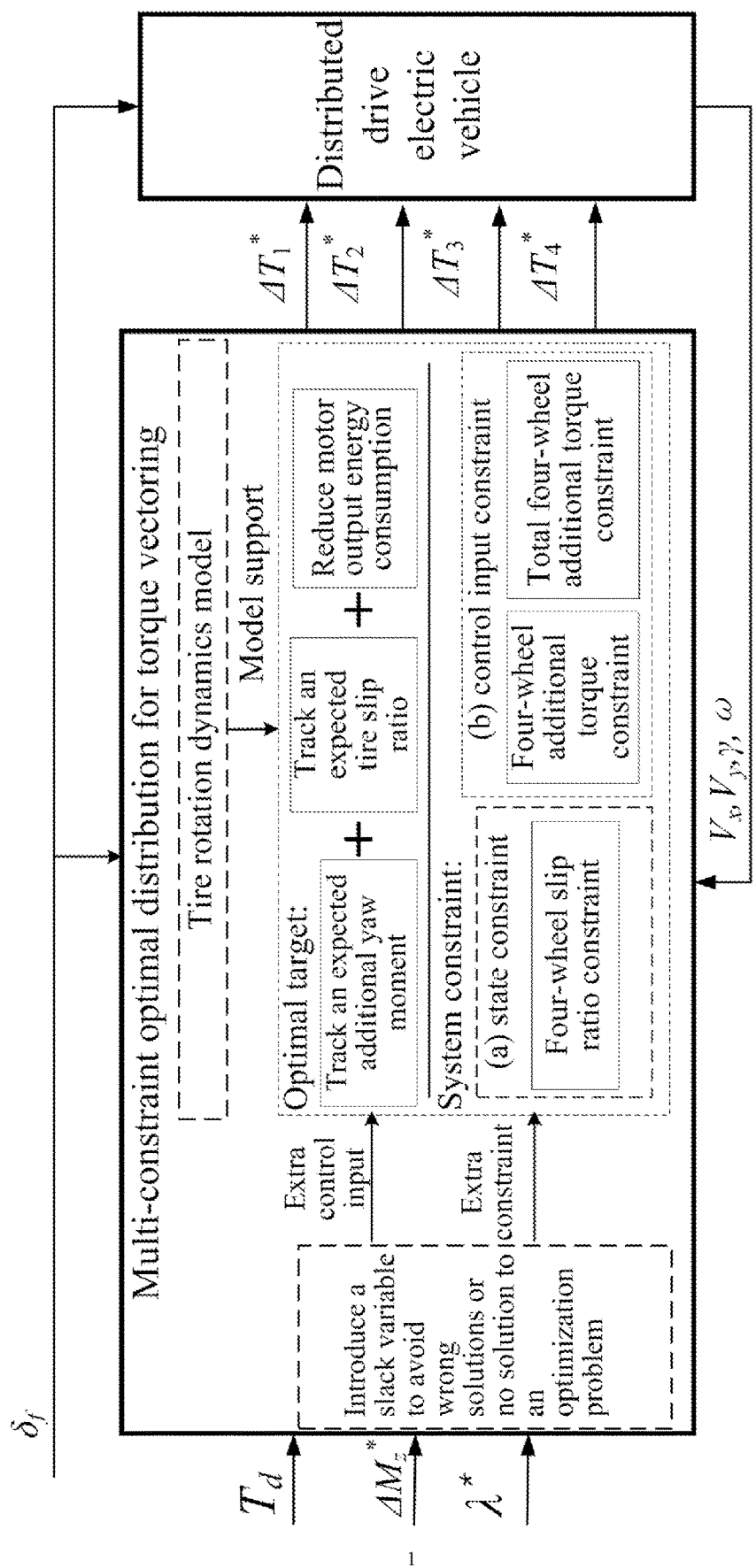
FIG. 1 is an architecture diagram of a multi-constraint optimal distribution method for a torque vectoring of a distributed drive electric vehicle according to an embodiment of the present disclosure.

In order to make the objectives, technical solutions, and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some, rather than all of the embodiments of the present disclosure. Generally, components of the embodiments of the present disclosure described and shown in the accompanying drawings may be arranged and designed in various manners.

Therefore, the following detailed description of the embodiments of the present disclosure in the accompanying drawings is not intended to limit the protection scope of the present disclosure, but merely indicates selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the accompanying drawings below. Therefore, once an item is defined in one accompanying drawing, it does not need to be further defined and described in subsequent accompanying drawings.

Embodiment 1

The embodiment provides a multi-constraint optimal distribution method for a torque vectoring of a distributed drive electric vehicle, including:

a vehicle real-time motion state is obtained, a pre-constructed tire rotation dynamics model is taken as a control object of an optimal distribution problem, an objective function for tracking a desired additional yaw moment, tracking a desired tire slip ratio and suppressing motor output energy consumption to a minimum value is established, a corresponding system constraint is established, the optimal distribution problem is solved, and an optimal distribution solution for a torque vectoring of each tire is obtained.

The system constraint includes a constraint limit on an important system state and a constraint limit on a system control input to be optimized. The constraint limit on an important system state includes a slip ratio constraint. The constraint limit on a system control input to be optimized includes a tire additional torque constraint and a total additional torque constraint.

Preferably, in a process of solving the optimal distribution problem, priority of the constraint limit on a system control input to be optimized is set higher than priority of the constraint limit on an important system state.

Preferably, in a process of solving the optimal distribution problem, the method further introduces a slack variable as an additional control input, and a slip ratio constraint is modified according to the slack variable.

The priority of the constraints is graded from low to high through a method for constructing the slack variable, and on the premise of strictly satisfying a higher-level constraint, a lower-level constraint is released to a certain extent, such that wrong solutions or no solution is avoided.

Specifically, the present method is implemented by the following technical solutions.

S1, a high-fidelity vehicle dynamics model is established.

In Carsim dynamics simulation software, vehicle model is selected, vehicle parameters are configured, and input and output variable interfaces are defined. A multi-constraint optimal distribution algorithm for a torque vectoring is built based on MATLAB/Simulink. Input of the algorithm is a vehicle real-time motion state from Carsim dynamics simulation software, and output of the algorithm is sent to a vehicle control input interface of Carsim dynamics simulation software. Based on the selected vehicle model and the parameters, a simulation condition of stable running of a vehicle on a low-adhesion road surface is established, and effectiveness of the present disclosure is verified through simulation.

S2, a multi-constraint optimal distribution method for a torque vectoring is designed.

Specifically, the following sub-steps are included.

S2.1, a tire rotation dynamics model is established.

$$\dot{\omega}_i = g_c(\Delta T_i, T_d, F_{xi}, R_e, I_\omega) \qquad (1)$$

where subscripts i=1,2,3,4 represent a left front wheel, a right front wheel, a left rear wheel and a right rear wheel respectively; $\omega$ is a tire rotation velocity; $\Delta T$ is tire additional torque, which is a control input obtained through the distribution method for a torque vectoring in the present disclosure; $T_d$ is a drive moment/brake moment applied by a driver; $F_x$ is a tire longitudinal force, which is calculated from a tire model; $R_e$ is an effective rotation radius of each tire; $I_\omega$ is a moment of inertia of the tire; and $g_c$ is a function relationship representation symbol.

S2.2, a longitudinal velocity at a center of a tire is calculated.

$$V_{xi} = h(V_x, V_y, \gamma, \delta_f, L_f, L_r, d) \qquad (2)$$

where $V_x$ is a longitudinal velocity of the vehicle, $V_y$ is a lateral velocity of the vehicle, $\gamma$ is a yaw rate of the vehicle, $\delta_f$ is a front wheel angle, $L_f$, $L_r$ are distances from a center of mass to a front axle and a rear axle respectively, d is a wheel track of the vehicle, and h is a function relationship representation symbol.

S2.3, a tire slip ratio is calculated.

$$\lambda_i = \Lambda(\omega_i, V_{xi}, R_e) \qquad (3)$$

where $\Lambda$ is a function relationship representation symbol.

S2.4, a tire model is established.

$$F_{xi} = f_x(V_x, V_y, \gamma, \delta_f, \lambda_i, L_f, L_r, C_f, C_r, F_{zi})$$

$$F_{yi} = f_y(V_x, V_y, \gamma, \delta_f, \lambda_i, L_f, L_r, C_f, C_r, F_{zi}) \qquad (4)$$

where $C_f$, $C_r$ are cornering stiffness of the front tires and the rear tires respectively; $F_{zi}$ is a vertical tire load; and $f_x$, $f_y$ are symbols expressing functional relations.

S2.5, a tire rotation state is predicted.

Expression (1) is discretized. A sampling time is $T_s$. A discretized tire rotation model is obtained as follows:

$$\omega_i(k+1)=g_d(\omega_i(k),\Delta T_i(k),T_{di},F_{xi},R_e,I_\omega) \quad (5)$$

where $g_d$ is a function relationship representation symbol.

A system state vector is taken as the tire slip ratio, that is, $\bar{x}=[\bar{x}_1, \bar{x}_2, \bar{x}_3, \bar{x}_4]^T=[\omega_1, \omega_2, \omega_3, \omega_4]^T$. A system control vector is taken as the tire additional torque, that is, $\bar{u}=[\Delta T_1, \Delta T_2, \Delta T_3, \Delta T_4]^T$. A system prediction equation is as follows:

$$x(k+1)=\overline{G}_d(\bar{x}(k),\overline{U}(k)) \quad (6)$$

where $\overline{G}_d$ is a function relationship representation symbol.

Assuming that a predictive horizon of a torque vectoring control method in the present disclosure is n, a system state space equation in the entire predictive horizon is as follows:

$$X(k+1)=\overline{G}_d(x(k),\overline{U}(k)) \quad (7)$$

where $$\bar{X}(k+1) = \begin{bmatrix} \bar{x}(k+1) \\ \bar{x}(k+2) \\ \vdots \\ \bar{x}(k+n) \end{bmatrix};$$

$$\overline{U}(k) = \begin{bmatrix} \bar{u}(k) \\ \bar{u}(k+1) \\ \vdots \\ \bar{u}(k+n-1) \end{bmatrix};$$

and $\overline{G}_d$ is a function relationship representation symbol.

S2.6, an objective function is defined.

In the torque vectoring control method in the present disclosure, both a desired additional yaw moment and a desired tire slip ratio should be tracked, and moreover, motor output energy consumption should be reduced. Corresponding objective functions are as follows:

(1) A desired additional yaw moment is tracked.

$$J_1 = \sum_{i=1}^{n} \Phi_1 \|\Delta M_z(k+i-1) - \Delta M_z^*\|^2 \quad (8)$$

where $\Phi_1$ is a weight coefficient of function $J_1$; $\Delta M_z^*$ is the desired additional yaw moment, which is considered as a known quantity in the present disclosure and assumed to remain constant in the predictive horizon; and $\Delta M_z$ is an actual additional yaw moment generated by a control input through a calculation method as follows:

$$\Delta M_z = \Omega(\Delta T_1, \Delta T_2, \Delta T_3, \Delta T_4) \quad (9)$$

where $\Omega$ is a function relationship representation symbol.

(2) A desired tire slip ratio is tracked.

$$J_2 = \sum_{i=1}^{n} \sum_{j=1}^{4} \Phi_2 \|\lambda_j(k+i-1) - \lambda_j^*(k+i-1)\|^2 \quad (10)$$

where $\Phi_2$ is a weight coefficient of function $J_2$; and $\lambda^*$ is a desired slip ratio sequence, which is considered as a known quantity in the present disclosure.

(3) Motor output energy consumption is reduced.

$$J_3 = \sum_{i=1}^{n} \Phi_3 \|u(k+i-1)\|^2 \quad (11)$$

where $\Phi_3$ is a weight coefficient of function $J_3$.

In summary, the objective function established in the torque vectoring control method design of the present disclosure is as follows:

$$J=J_1+J_2+J_3 \quad (12)$$

S2.7, system constraints are constructed.

When the system constraints are constructed, there are mainly two types of constraints. One type is a constraint limit on an important system state, a main purpose of which is to make such a physical state satisfy requirements of driving safety of a vehicle. The other type is a constraint limit on a system control input to be optimized, a main purpose of which is to limit actuation energy solved by the optimization problem, so as to avoid excessive interference caused by application of the control input with driving of a vehicle. In this step, establishment of the two types of constraints will be explained separately.

(1) Constraint Limits on an Important System Physical State

A slip ratio is an important physical state in driving stability control over a vehicle. The slip ratio directly reflects a degree of tire slip. Too large slip ratio indicates the serious degree of tire slip, which directly influences on driving stability of a vehicle.

In S2.6, a soft constraint on the slip ratio is achieved by adding tracking of the desired slip ratio to the objective function, but the soft constraint cannot guarantee that the slip ratio is maintained within a certain range, such that a hard constraint should also be added to satisfy the above requirements.

A slip ratio vector is defined as $\Delta=[\lambda_1, \lambda_2, \lambda_3, \lambda_4]^T$, and an upper limit value vector and a lower limit value vector of the tire slip ratio are respectively defined as $\lambda_{low}$, $\lambda_{up}$, which are considered as known quantities in the present disclosure. A slip ratio constraint is as follows:

$$\lambda_{low} \leq \lambda \leq \lambda_{up} \quad (13)$$

Expressions (1), (3), (7) and (13) are combined. The slip ratio constraint is transformed into a control input constraint in the whole predictive horizon, and a first term of the control input constraint is obtained as:

$$\Pi_1(\overline{U}(k),\lambda_{low},\lambda_{up}) \leq 0 \quad (14)$$

where $\Pi_1$ is a functional relation symbol.

(2) Constraint Limits on a System Control Input to be Optimized

A system variable to be optimized is four-wheel additional torque. Firstly, a value range is directly limited, an upper limit value and a lower limit value of the tire additional torque are respectively set as $u_{low}$, $u_{up}$, and then $$u_{low} \leq u \leq u_{up} \quad (15)$$

In the entire prediction, a second term of the control input constraint is as follows:

$$\Pi_2(\overline{U}(k),u_{low},u_{up}) \leq 0 \quad (16)$$

where $\Pi_2$ is a functional relation symbol.

Moreover, in order to avoid the interference of accidental acceleration and deceleration with driving of a driver, input of system energy is limited in a certain range by constraining the total additional torque. An upper limit and a lower limit of the total additional torque are set to be $T_{sum\_up}$, $T_{sum\_low}$ respectively, and then a third term of the control input constraint is as follows:

$$\Pi_3(\overline{U}(k),T_{sum\_low},T_{sum\_up}) \leq 0 \quad (17)$$

where $\Pi_3$ is a functional relation symbol.

S2.8, a slack variable is introduced as an additional control input to avoid wrong solutions or no solution to an optimization problem.

In S2.7, constraints on the slip ratio and constraints on the additional torque and the total additional torque are finally transformed into constraints on a control input sequence U(k). Too many constraints narrow a feasible solution range and even lead to wrong solutions or no solution to the optimization problem. Furthermore, a tire slip ratio in vehicle chassis control is usually limited in a small range, and a too strict slip ratio constraint under some extreme conditions leads to wrong solutions or no solution to the optimization problem. The present disclosure avoids the above problems by grading priority of the constraints and introducing the slack variable as an additional control input.

(1) Priority of the constraints is graded.

As for a torque vectoring distribution problem, first it should be guaranteed that additional torque does not cause excessive interference with driving of a driver, and excessive increase and decrease in system energy should also be avoided. Therefore, the priority of the additional torque constraint and the priority of the total additional torque constraint are raise to the highest. For the tire slip ratio constraint, the slip ratio can be controlled in a small range by torque vectoring distribution under normal driving conditions. For some extreme conditions, the slip ratio constraint can be released slightly to avoid wrong solutions or no solution. Therefore, the slip ratio constraint has the lowest priority.

(2) The slack variable is introduced as an additional control input.

A slack variable sequence is defined as $\epsilon=[\epsilon_1, \epsilon_2, \epsilon_3, \epsilon_4]^T$. The slip ratio constraint is modified as follows:

$$\lambda_{low} - \epsilon \leq \lambda \leq \lambda_{up} + \epsilon \quad (18)$$

The slack variable is regarded as an additional control input, and then the control input sequence is changed as follows:

$$\bar{u} = [\Delta T_1, \Delta T_2, \Delta T_3, \Delta T_4, \epsilon_1, \epsilon_2, \epsilon_3, \epsilon_4]^T \quad (19)$$

Similarly, constraints are added to the slack variable to satisfy requirements for the priority of the constraints, that is, $$0 \leq \epsilon \leq \epsilon_{max} \quad (20)$$

where $\epsilon_{max}$ is an upper limit value of the slack variable, which is considered as a known quantity in the present disclosure.

S2.9, an optimization problem to be constrained is solved to obtain an optimal distribution solution for a torque vectoring.

S2.5-2.7 are repeated to obtain the optimization problem to be constrained after the slack variable is taken as an additional control input.

$$\min_{\bar{U}(K)} J = J_1 + J_2 + J_3 \quad (21)$$

$$\text{s.t.} \prod_1 \left( \bar{U}(k), \lambda_{low}, \lambda_{up} \right) \leq 0$$

$$\prod_2 \left( \bar{U}(k), u_{low}, u_{up}, \sigma_{max} \right) \leq 0$$

$$\prod_3 \left( \bar{U}(k), T_{sum_{low}}, T_{sum_{up}} \right) \leq 0$$

An optimal control sequence U*(k) is obtained by solving the above problem to be optimized. A first group of control input of the optimal control sequence is the optimal distribution solution for a torque vectoring, that is, $$\Delta T_1^* = U^*(1), \Delta T_2^* = U^*(2), \Delta T_3^* = U^*(3), \Delta T_4^* = U^*(4) \quad (22)$$

The above solution is described in detail below with a specific implementation process.

An architecture of the multi-constraint optimal distribution method for a torque vectoring proposed in the embodiment is shown in FIG. 1. A front wheel angle $\delta_f$, a drive/brake moment $T_d$ applied by a driver, a desired additional yaw moment $\Delta M_z^*$ and a desired tire slip ratio $\lambda^*$ are all considered as known quantities in the present disclosure. In multi-constraint optimal distribution control for a torque vectoring, a tire rotation dynamics model is constructed firstly, which is taken as a control object of an optimal distribution problem. The next step is to construct an objective function of the optimization problem. The objective function consists of tracking the desired additional yaw moment, tracking the desired tire slip ratio and reducing motor output energy consumption. Then system constraints are constructed. The system constraints include two types, one type is a state constraint represented by a tire slip ratio constraint, and the other type is control input constraints represented by four-wheel additional torque constraints and a total four-wheel additional torque constraint. In order to avoid wrong solutions or no solution to the optimization problem, a slack variable is introduced to grade priority of the constraints, and the slack variable is added into construction of the optimization problem as an extra control input. Finally, the optimization problem is solved to obtain an optimal torque distribution solution.

The multi-constraint optimal distribution method for a torque vectoring described in the embodiment is realized and verified through joint simulation of software systems, and a specific process is as follows.

1. Software Selection

Writing for a multi-constraint optimal distribution algorithm for a torque vectoring and construction of a controlled-object simulation model provided in the present disclosure are respectively implemented by means of software Matlab/Simulink and high-fidelity vehicle dynamics simulation software CarSim with software versions of Matlab R2020a and CarSim2019.1 respectively. Matlab/Simulink is configured to construct the multi-constraint optimal distribution algorithm for a torque vectoring, and program implementation of the multi-constraint optimal distribution algorithm for a torque vectoring is completed by modular programming in simulink. CarSim is mainly configured to provide a high-fidelity vehicle dynamics model and corresponding simulation conditions, and the model replaces a real vehicle as an implementation object of the designed distribution algorithm for a torque vectoring in an simulation experiment.

2. Joint Simulation Setup

In order to achieve joint simulation of the two pieces of software. Firstly, an input and output interface module of Carsim is configured. A simulink model path is added to Carsim software for joint communication. Carsim is compiled, and a corresponding S-Function module is generated in simulink. Finally, parameters of S-Function are configured, and the input and output signal interfaces are derived. The joint simulation has a step size set to be 0.001 s. The CarSim model also performs calculation and solving when the Simulink simulation model is run. In a simulation process, data exchange between the CarSim and simulink is carried out continuously. When a model structure or parameter settings in CarSim are modified, recompiling is needed.

Then the S-Function module needs to be regenerated to update configuration information of CarSim software.

In order to verify effectiveness of the multi-constraint optimal distribution method for a torque vectoring in the present disclosure, vehicle stability control on a low-adhesion road surface is selected for method verification. Firstly, a joint simulation software platform based on MATLAB/Simulink and Carsim high-fidelity dynamics software is built, and vehicle model selection and parameter configuration are carried out. Then a multi-constraint optimal distribution algorithm for a torque vectoring is built in MATLAB/Simulink, and input and output interfaces are defined to satisfy requirements of joint simulation. Finally, a vehicle stability control test condition with a low-adhesion road surface is set in Carsim. The method provided in the present disclosure is verified. Moreover, the method is compared with a traditional four-wheel torque equal-distribution method, and a beneficial effects of the present disclosure is illustrated.

Specific steps of the present disclosure are as follows.

S1, a high-fidelity vehicle dynamics model is established.

The high-fidelity vehicle dynamics model is used for simulating a real control object, that is, a distributed drive electric vehicle in the present disclosure. The high-fidelity vehicle dynamics model constructed herein mainly simulates yaw motion and lateral motion of a real vehicle.

In Carsim, a passenger car model is selected, and then parameter configuration is performed on the passenger car model. Since the present disclosure is concerned with torque vectoring distribution solutions, tire related parameters, such as an effective rotation radius of a tire, a moment of inertia of a tire, cornering stiffness of a tire, etc., are focused herein. Vehicle driving conditions are configured, mainly including a vehicle driving route, road adhesion conditions, etc. Since the present disclosure focuses on the torque vectoring distribution solutions, system input such as a front wheel angle $\delta_f$, a drive moment/brake moment $T_d$ applied by a driver, a desired additional yaw moment $\Delta M_z^*$ and a desired tire slip ratio $\lambda^*$ is given by other modules and is not repeated herein. Finally, input and output interfaces of Carsim are configured. For example, four-wheel additional torque is used as the input interface, and important vehicle state information is used as an output interface. After the above configuration is completed, Carsim is added to simulink in a S-Function mode, and the algorithm matches the input and output interfaces of the Carsim module.

S2, a multi-constraint optimal distribution method for a torque vectoring is designed.

Specifically, the following sub-steps are included.

S2.1, a tire rotation dynamics model is established.

Figure 2:
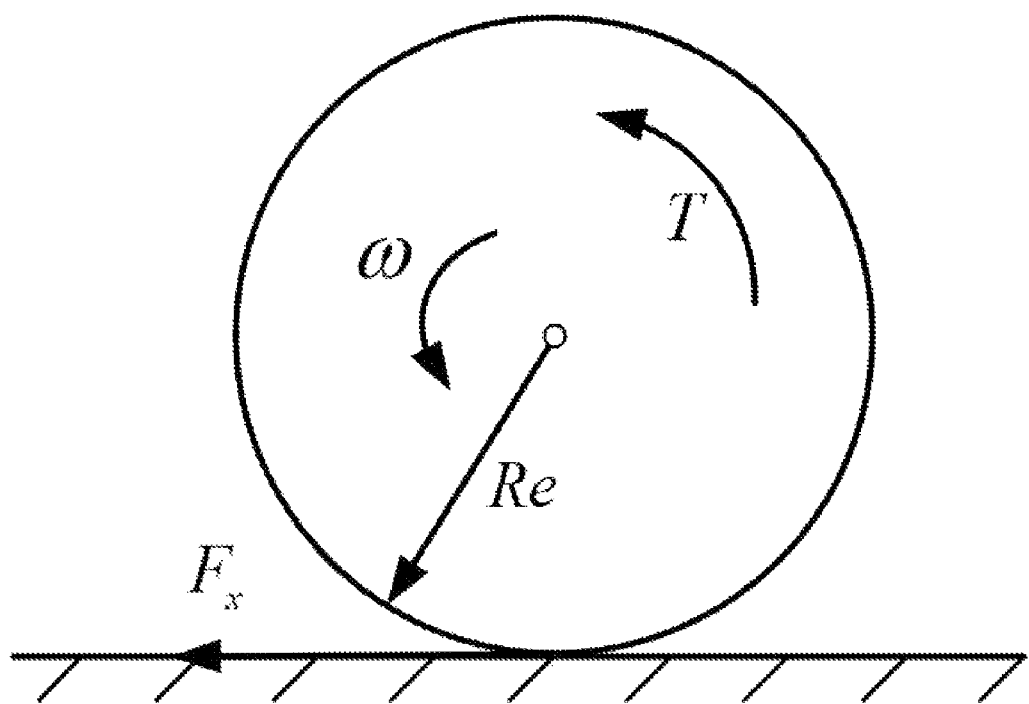
FIG. 2 is a schematic diagram of a tire rotation model according to an embodiment of the present disclosure.

The tire rotation dynamics model is shown in FIG. 2. A tire rotation dynamics equation constructed according to the model is as follows:

$$\dot{\omega}_i = \frac{1}{I_w}(-F_{xi}\text{Re} + T_i) \qquad (23)$$

where subscripts i=1,2,3,4 represent a left front wheel, a right front wheel, a left rear wheel and a right rear wheel respectively; ω is a tire rotation velocity; T is total torque applied to the tires, which is calculated as $T=T_d+\Delta T$, where $\Delta T$ is tire additional torque, which is a control input obtained through the distribution method for a torque vectoring in the present disclosure; $T_d$ is a drive moment/brake moment applied by a driver; $F_x$ is a tire longitudinal force, which is calculated from a tire model; $R_e$ is an effective rotation radius of each tire; and $I_\omega$ is a moment of inertia of the tire.

S2.2, a longitudinal velocity at a center of a tire is calculated.

The longitudinal velocity at a center of a tire consists of two components. The first component is a component of a center-of-mass velocity of a vehicle at the center of the tire. The second component is a component of a yaw rate of the vehicle at the tire center. Therefore, the velocity at a center of a tire is a vector sum of the two components with an expression as follows:

$$V_{x1} = V_x\cos\delta_f + V_y\sin\delta_f - \gamma\sqrt{L_f^2 + \frac{d^2}{2}}\cos\left(\tan^{-1}\frac{2L_f}{d} + \delta_f\right) \qquad (24)$$

$$V_{x2} = V_x\cos\delta_f + V_y\sin\delta_f + \gamma\sqrt{L_f^2 + \frac{d^2}{2}}\cos\left(\tan^{-1}\frac{2L_f}{d} + \delta_f\right)$$

$$V_{x3} = V_x\cos\delta_r + V_y\sin\delta_r - \gamma\sqrt{L_r^2 + \frac{d^2}{2}}\cos\left(\tan^{-1}\frac{2L_r}{d}\right)$$

$$V_{x4} = V_x\cos\delta_r + V_y\sin\delta_r + \gamma\sqrt{L_r^2 + \frac{d^2}{2}}\cos\left(\tan^{-1}\frac{2L_r}{d}\right)$$

where $V_x$ is a longitudinal velocity of the vehicle, $V_y$ is a lateral velocity of the vehicle, $\gamma$ is a yaw rate of the vehicle, $\delta_f$ is a front wheel angle, $L_f$, $L_r$ are distances from a center of mass to a front axle and a rear axle respectively, and d is a wheel track of the vehicle.

S2.3, a tire slip ratio is calculated.

The tire slip ratio is calculated as follows:

$$\lambda_i = \frac{\omega_i \text{Re} - V_{xi}}{V_{xi}} \qquad (25)$$

S2.4, a tire model is established.

In order to predict a rotation state of the tire, a tire longitudinal force at a current time needs to be considered. The present disclosure calculates the tire force using a composite brush tire model. The composite brush tire model can be expressed as:

$$F = \begin{cases} \sigma C - \frac{\sigma^2 C^2}{3\mu F_z} + \frac{\sigma^3 C^3}{27\mu^2 F_z^2}, & \sigma \le \frac{3\mu F_z}{C} \\ \mu F_z, & \sigma \ge \frac{3\mu F_z}{C} \end{cases} \qquad (26)$$

where $C_f$, $C_r$ is cornering stiffness of the front tires and the rear tires respectively; $F_z$ is a vertical tire load; F is a total tire force; and $\sigma$ is a tire compound slip ratio, which is calculated as follows:

$$\sigma = |\vec{\sigma}| = \sqrt{\sigma_x^2 + \sigma_y^2} \qquad (27)$$

$$\sigma_x = \frac{\lambda}{1+\lambda}, \sigma_y = \frac{-\alpha}{1+\lambda}$$

In the above expressions, α is a tire slip angle, which is calculated as follows:

$$\alpha_f = \frac{V_y + L_f\gamma}{V_x} - \delta_f \qquad (28)$$

$$\alpha_r = \frac{V_y - L_r \gamma}{V_x}$$

where $\alpha_f$ is a front wheel slip angle, and $\alpha_r$ is a rear wheel slip angle.

Based on the above definitions, the tire longitudinal force and a lateral force are calculated as follows:

$$F_x = \frac{\sigma_x}{\sigma}F, \quad F_y = \frac{\sigma_y}{\sigma}F \tag{29}$$

S2.5, a tire rotation state is predicted.

Expression (23) is discretized. A sampling time is $T_s$. A discretized tire rotation model is obtained as follows:

$$\omega_i(k+1) = \omega_i(k) + \frac{T_s}{I_\omega}(-F_{xi}R_e + T_d + \Delta T_i(k)) \tag{30}$$

A state vector of a system is defined as $\bar{x}=[\bar{x}_1, \bar{x}_2, \bar{x}_3, \bar{x}_4]^T=[\omega_1, \omega_2, \omega_3, \omega_4]^T$, and a control vector is defined as $\bar{u}=[\Delta T_1, \Delta T_2, \Delta T_3, \Delta T_4, \epsilon_1, \epsilon_2, \epsilon_3, \epsilon_4]^T$. $\Delta T$ represents motor additional torque, and E represents a slack variable. Accordingly, a state space equation of the system can be obtained as follows:

$$\bar{x}(k+1) = A\bar{x}(k) + B\bar{u}(k) + E \tag{31}$$

where $$A = I, \quad B[I_4 \quad 0_4]\frac{T_s}{I_\omega}, \quad E = \frac{T_s}{I_\omega}(\tilde{T}_d - R_e \tilde{F}_x).$$

I is a fourth-order identity matrix; $0_{4\times 4}$ is a fourth-order square matrix with all elements being 0; $\tilde{F}_x=[F_{x1} \ F_{x2} \ F_{x3} \ F_{x4}]^T$ is a tire force vector; and $\tilde{T}_d=[T_{d1} \ T_{d2} \ T_{d3} \ T_{d4}]^T$ is a drive/brake force vector applied by a driver.

Assuming that a predictive horizon of a torque vectoring control method in the present disclosure is n, a system state space equation in the entire predictive horizon is as follows:

$$\bar{X}(k+1|k) = \bar{A}\bar{x}(k) + \bar{B}\bar{U}(k) + \bar{E} \tag{32}$$

where $$\bar{X}(k+1) = \begin{bmatrix} \bar{x}(k+1) \\ \bar{x}(k+1) \\ \vdots \\ \bar{x}(k+n) \end{bmatrix}, \bar{U}(k) = \begin{bmatrix} \bar{u}(k) \\ \bar{u}(k+1) \\ \vdots \\ \bar{u}(k+n-1) \end{bmatrix}, \bar{A} = \begin{bmatrix} A \\ A^2 \\ \vdots \\ A^n \end{bmatrix} \tag{33}$$

$$\bar{E} = \begin{bmatrix} E \\ AE + E \\ \vdots \\ A^{n-1}E + \ldots + AE + E \end{bmatrix}, \bar{B} = \begin{bmatrix} B & 0 & \ldots & 0 \\ AB & B & \ldots & 0 \\ \vdots & \vdots & \ddots & \vdots \\ A^{n-1}B & A^{n-2}B & \ldots & B \end{bmatrix}$$

S2.6, an objective function is defined.

In the torque vectoring control method in the present disclosure, both a desired additional yaw moment and a desired tire slip ratio should be tracked, and moreover, motor output energy consumption should be reduced. Corresponding objective function are as follows:

(1) a desired additional yaw moment is tracked.

$$J_1 = \sum_{i=1}^{n} \Phi_1 \|\Delta M_z(k+i-1) - \Delta M_z^*\|^2 \tag{34}$$

where $\Phi_1$ is a weight coefficient of function $J_1$; $\Delta M_z^*$ is the desired additional yaw moment, which is considered as a known quantity in the present disclosure and assumed to remain constant in the predictive horizon; and $\Delta M_z$ is an actual additional yaw moment generated by a control input through a calculation method as follows:

$$\Delta M_z = \frac{d}{2R_e}[(\Delta T_2 - \Delta T_1) + (\Delta T_4 - \Delta T_3)] = \tag{35}$$

$$\tilde{A}(\Delta T_1, \Delta T_2, \Delta T_3, \Delta T_4, \epsilon_1, \epsilon_2, \epsilon_3, \epsilon_4)^T$$

where $$\tilde{A} = \frac{d}{2R_e}(-1, 1, -1, 1, 0, 0, 0, 0)^T$$

(2) a desired tire slip ratio is tracked.

$$J_2 = \sum_{i=1}^{n}\sum_{j=1}^{4} \Phi_2 \|\lambda_j(k+i-1) - \lambda_j^*(k+i-1)\|^2 \tag{36}$$

where $\Phi_2$ is a weight coefficient of function $J_2$; and $\lambda^*$ is a desired slip ratio sequence, which is considered as a known quantity in the present disclosure.

(3) motor output energy consumption is reduced.

$$J_3 = \sum_{i=1}^{n} \Phi_3 \|u(k+i-1)\|^2 \tag{37}$$

where $\Phi_3$ is a weight coefficient of function $J_3$.

In summary, the objective function established in the torque vectoring control method design of the present disclosure is as follows:

$$J = J_1 + J_2 + J_3 \tag{38}$$

S2.7, system constraints are constructed.

(1) Constraint limits on an important system physical state

A slip ratio vector is defined as $\lambda = [\lambda_1, \lambda_2, \lambda_3, \lambda_4]^T$. In a future predictive horizon n, the tire slip ratio can be expressed as follows:

$$\bar{\Lambda}(k+1) = [\lambda(k+1)^T, \lambda(k+2)^T, \ldots \lambda(k+n)^T]^T = \tag{39}$$

$$R_e \tilde{V}[\bar{A}\bar{x}(k) + \bar{B}\bar{U}(k) + \bar{E}] - \bar{I}_{4n\times 1}$$

where $\tilde{V}$ is a velocity matrix at the centers of the four tires, which is calculated as follows:

$$\tilde{V} = \begin{pmatrix} \bar{V} & 0 & \ldots & 0 \\ 0 & \bar{V} & \ldots & 0 \\ 0 & 0 & \ddots & 0 \\ 0 & 0 & \ldots & \bar{V} \end{pmatrix}_{4n\times 4n}, \bar{V} = \begin{pmatrix} \frac{1}{V_{x1}} & 0 & 0 & 0 \\ 0 & \frac{1}{V_{x2}} & 0 & 0 \\ 0 & 0 & \frac{1}{V_{x3}} & 0 \\ 0 & 0 & 0 & \frac{1}{V_{x4}} \end{pmatrix} \tag{40}$$

An upper limit value vector and a lower limit value vector of the tire slip ratio are respectively defined as $\lambda_{low}$, $\lambda_{up}$, which are considered as known quantities in the present disclosure. In order to avoid wrong solutions or no solution during solving of the optimization problem, priority of the constrains is graded. The priority of the slip ratio is set to the lowest, which means that the slip ratio is allowed to be beyond a constraint boundary slightly under some extreme conditions. Therefore, a slack variable E is added to the slip ratio constraint, and the slip ratio constraint is as follows:

$$\lambda_{low} - \epsilon \leq \lambda \leq \lambda_{up} + \epsilon \tag{41}$$

Expressions (39) and (41) are combined to obtain $$\Lambda_{low} - \overline{DU}(k) \leq R_e \overline{V}[\overline{Ax}(k) + \overline{BU}(k) + \overline{E}] - \overline{I}_{4n \times 1 \leq} \Lambda_{up} + \overline{D}\overline{U}(k) \tag{42}$$

where $$\overline{D} = \begin{bmatrix} D & 0 & 0 & 0 \\ 0 & D & 0 & 0 \\ 0 & 0 & \ddots & \vdots \\ 0 & 0 & \ldots & D \end{bmatrix}_{4n \times 8n},$$

$$D = [0_4 I_4] \Lambda_{up} = [\lambda_{up}^T, \lambda_{up}^T, \ldots, \lambda_{up}^T]^T,$$

$$\Lambda_{low} = [\lambda_{low}^T, \lambda_{low}^T, \ldots, \lambda_{low}^T]^T \tag{43}$$

Expression (42) is transformed, and the slip ratio constraint is transformed into a constraint on a control input:

$$\begin{bmatrix} R_e \overline{V}\overline{B}\overline{U}(k) - \overline{D}\overline{U}(k) \\ -R_e \overline{V}\overline{B}\overline{U}(k) - \overline{D}\overline{U}(k) \end{bmatrix} \leq \begin{bmatrix} \overline{\Lambda}_{up} + \overline{I}_{4n \times 1} - R_e \overline{V}(\overline{A}\overline{x}(k) + \overline{E}) \\ \overline{\Lambda}_{low} - \overline{I}_{4n \times 1} + R_e \overline{V}(\overline{A}\overline{x}(k) + \overline{E}) \end{bmatrix} \tag{44}$$

(2) Constraint limits on a system control input to be optimized

A system variable to be optimized is four-wheel additional torque. Firstly, a value range is directly limited, an upper limit value and a lower limit value of the tire additional torque are respectively set as $u_{min}$, $u_{max}$, and then $$\begin{bmatrix} I_{8n}\overline{U}(k) \\ -I_{8n}\overline{U}(k) \end{bmatrix} \leq \begin{bmatrix} U_{up} \\ -U_{low} \end{bmatrix} \tag{45}$$

where $I_{8n}$ is an 8n-order identity matrix, an upper limit value vector of a control input $U_{up} = [u_{up}^T, u_{up}^T, \ldots, u_{up}^T]^T$, and a lower limit value vector of a control input $U_{low} = [u_{low}^T, u_{low}^T, \ldots, u_{low}^T]^T$.

Moreover, in order to avoid the interference of accidental acceleration and deceleration with driving of a driver, input of system energy is limited in a certain range by constraining the total additional torque. An upper limit and a lower limit of the total additional torque are set to be $T_{sum\_up}$, $T_{sum\_low}$ respectively, and then a third term of the control input constraint is as follows:

$$\overline{g}_{low} \leq \overline{GU}(k) \leq \overline{g}_{up} \tag{47}$$

where $$G = [1, 1, 1, 1, 0, 0, 0, 0], \overline{G} = \begin{pmatrix} G & 0 & \ldots & 0 \\ 0 & G & \ldots & 0 \\ 0 & 0 & \ddots & 0 \\ 0 & 0 & \ldots & G \end{pmatrix}_{n \times 8n} \tag{48}$$

$$\overline{g}_{low} = \begin{pmatrix} T_{sum,low} \\ T_{sum,low} \\ \vdots \\ T_{sum,low} \end{pmatrix}_{n \times 1}, \overline{g}_{up} = \begin{pmatrix} T_{sum,up} \\ T_{sum,up} \\ \vdots \\ T_{sum,up} \end{pmatrix}_{n \times 1}$$

The control input of the same type are combined to obtain $$\begin{bmatrix} \overline{GU}(k) \\ -\overline{GU}(k) \end{bmatrix} \leq \begin{bmatrix} \overline{g}_{up} \\ -\overline{g}_{low} \end{bmatrix} \tag{49}$$

S2.8, a slack variable is introduced as an additional control input to avoid wrong solutions or no solution to an optimization problem.

The step is included in S2.5-S2.7 and is not repeated herein.

S2.9, an optimization problem to be constrained is solved to obtain an optimal distribution solution for a torque vectoring.

In combination with S2.1-S2.8, the optimization problem is expressed as follows:

$$\min_{\overline{U}(k)} J = J_1 + J_2 + J_3 \tag{50}$$

$$\text{s.t. } A\overline{U}(k) \leq b$$

where $$A = \begin{bmatrix} I_{8n} \\ -I_{8n} \\ R_e \overline{V}\overline{B} - \overline{D} \\ -R_e \overline{V}\overline{B} - \overline{D} \\ \overline{G} \\ -\overline{G} \end{bmatrix}, b = \begin{bmatrix} U_{up} \\ -U_{low} \\ \overline{\Lambda}_{up} + \overline{I}_{4n \times 1} - R_e \overline{V}(\overline{A}\overline{x}(k) + \overline{E}) \\ -\overline{\Lambda}_{low} - \overline{I}_{4n \times 1} - R_e \overline{V}(\overline{A}\overline{x}(k) + \overline{E}) \\ \overline{g}_{up} \\ -\overline{g}_{low} \end{bmatrix} \tag{51}$$

An optimal control sequence U*(k) is obtained by solving the above problem to be optimized. A first group of control input of the optimal control sequence is the optimal distribution solution for a torque vectoring, that is, $$\Delta T_1^* = \overline{U}^*(1), \Delta T_2^* = \overline{U}^*(2), \Delta T_3^* = \overline{U}^*(3), \Delta T_4^* = \overline{U}^*(4) \tag{52}$$

In order to verify effectiveness of the multi-constraint optimal distribution method for a torque vectoring in the present disclosure, vehicle stability control on a low-adhesion road surface is selected for method verification. A comparison method is a traditional four-wheel torque equal-distribution method.

Parameters of the vehicle model used in simulation are as follows: a moment of inertia of a tire is $I_\omega = 1.68$ kg·m², an effective rotation radius of each tire is $R_e = 0.325$ m, a distance from a center of mass of the vehicle to a front axle is $L_f = 1.05$ m, a distance from the center of mass of the vehicle to a rear axle is $L_r = 1.61$ m, cornering stiffness of the front tires is $C_f = 43082$ N/rad, cornering stiffness of the rear tires is $C_r = 59950$ N/rad, and a wheel track of the vehicle is d=1.55 m. In low-adhesion road surface condition settings, a road surface adhesion coefficient is μ=0.35, and a vehicle driving condition is a double-lane shift condition. For the developed multi-constraint optimal distribution algorithm for a torque vectoring, a predictive horizon is n=3. A model discrete time is $T_s = 0.01$ s. An objective function weight is $\Phi_1 = 0.01$, $\Phi_2 = 100$. A control input weight of additional torque is 0.01. A control input weight of the slack variable is 100000. As for system constraints, the four-wheel slip ratio constraints remain the same, with an upper limit being $\lambda_{up}$=0.04 and a lower limit being $\lambda_{low}$=−0.04. The upper limit of the total additional torque constraint is $T_{sum,up}$=0, and the lower limit is $T_{sum,low}$=−100 Nm. The four-wheel additional torque remains the same with the upper limit being $u_{Up}$=1000 Nm and the lower limit being $u_{low}$=−1000 Nm. The additional control input of the slack variable added to the four wheels remains the same with the upper limit being $\epsilon_{up}$=0.05.

In the simulation test, the vehicle runs according to the double-lane shift condition, a velocity of the vehicle is 70 km/h and remains unchanged in a running process. A reference value of the additional yaw moment is $\Delta M_z^*$. The optimal four-wheel additional torque is determined through the multi-constraint optimal distribution method for a torque vectoring, to track the desired additional yaw moment. Simulation results are shown in the accompanying drawings.

Figure 3:
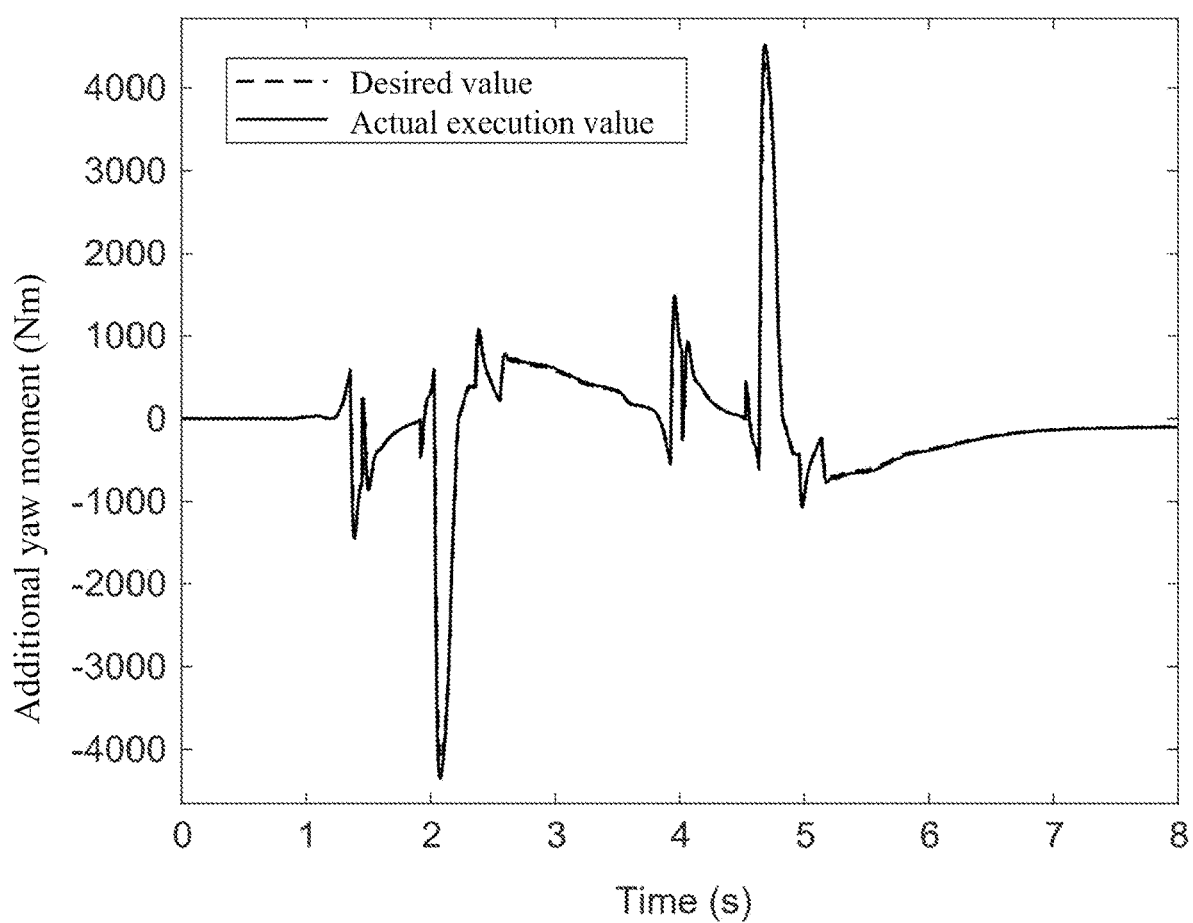
FIG. 3 is a schematic diagram of an additional yaw moment tracking curve in a multi-constraint optimal distribution method for a torque vectoring of the present disclosure in a simulation process according to an embodiment of the present disclosure.

FIG. 3 is an additional yaw moment tracking curve in the multi-constraint optimal distribution method for a torque vectoring in the present disclosure in the simulation process. It can be seen from analysis of the curve that after the four-wheel additional torque determined through the multi-constraint optimal distribution method for a torque vectoring in the present disclosure is applied to the high-fidelity vehicle dynamics model, an additional yaw moment obtained by the vehicle can better track the desired additional yaw moment, which indicates that the multi-constraint optimal distribution method for a torque vectoring in the present disclosure can better realize a control target.

Figure 4:
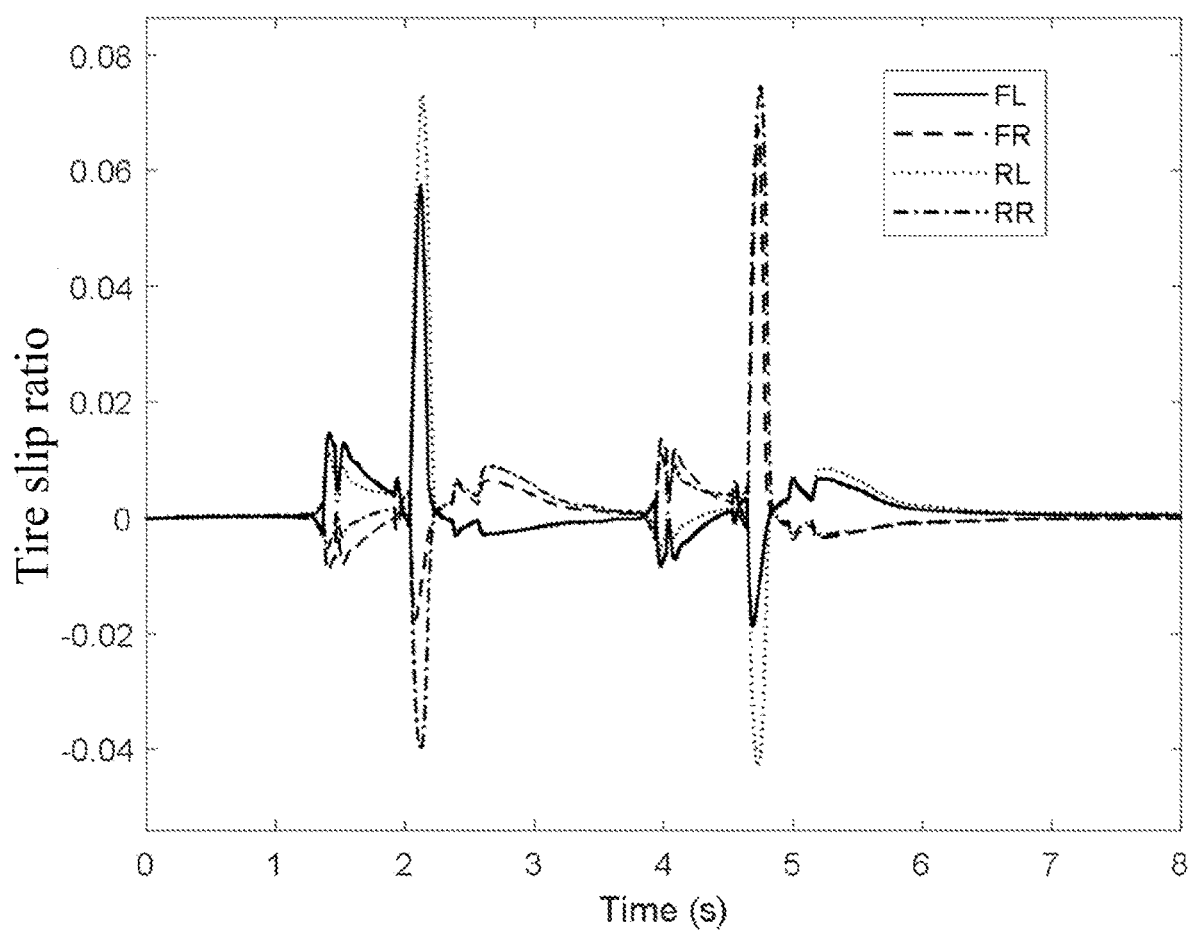
FIG. 4 is a schematic diagram of tire slip ratio curves in a multi-constraint optimal distribution method for a torque vectoring of the present disclosure in a simulation process according to an embodiment of the present disclosure.
Figure 5:
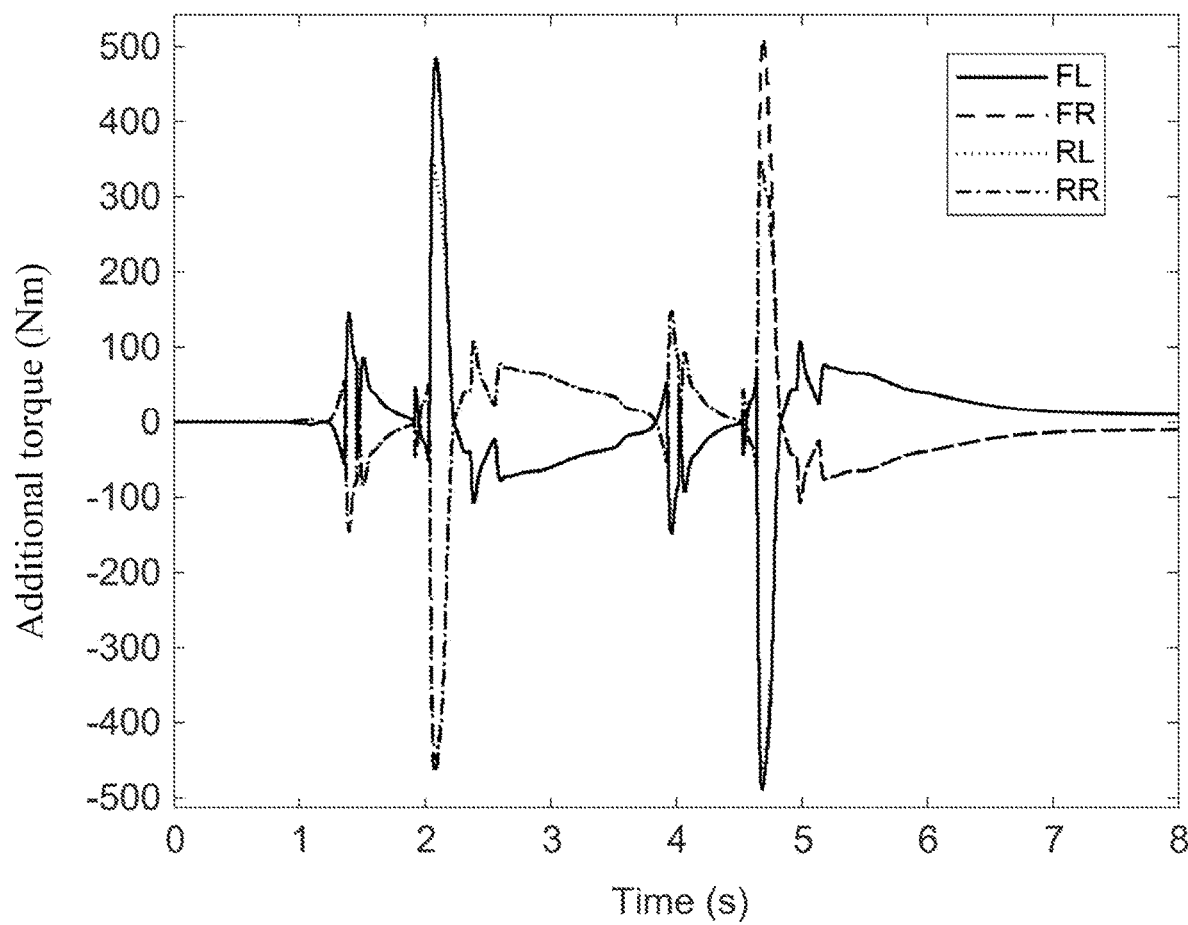
FIG. 5 is a schematic diagram of tire additional torque curves of four wheels in a multi-constraint optimal distribution method for a torque vectoring of the present disclosure in a simulation process according to an embodiment of the present disclosure.
Figure 6:
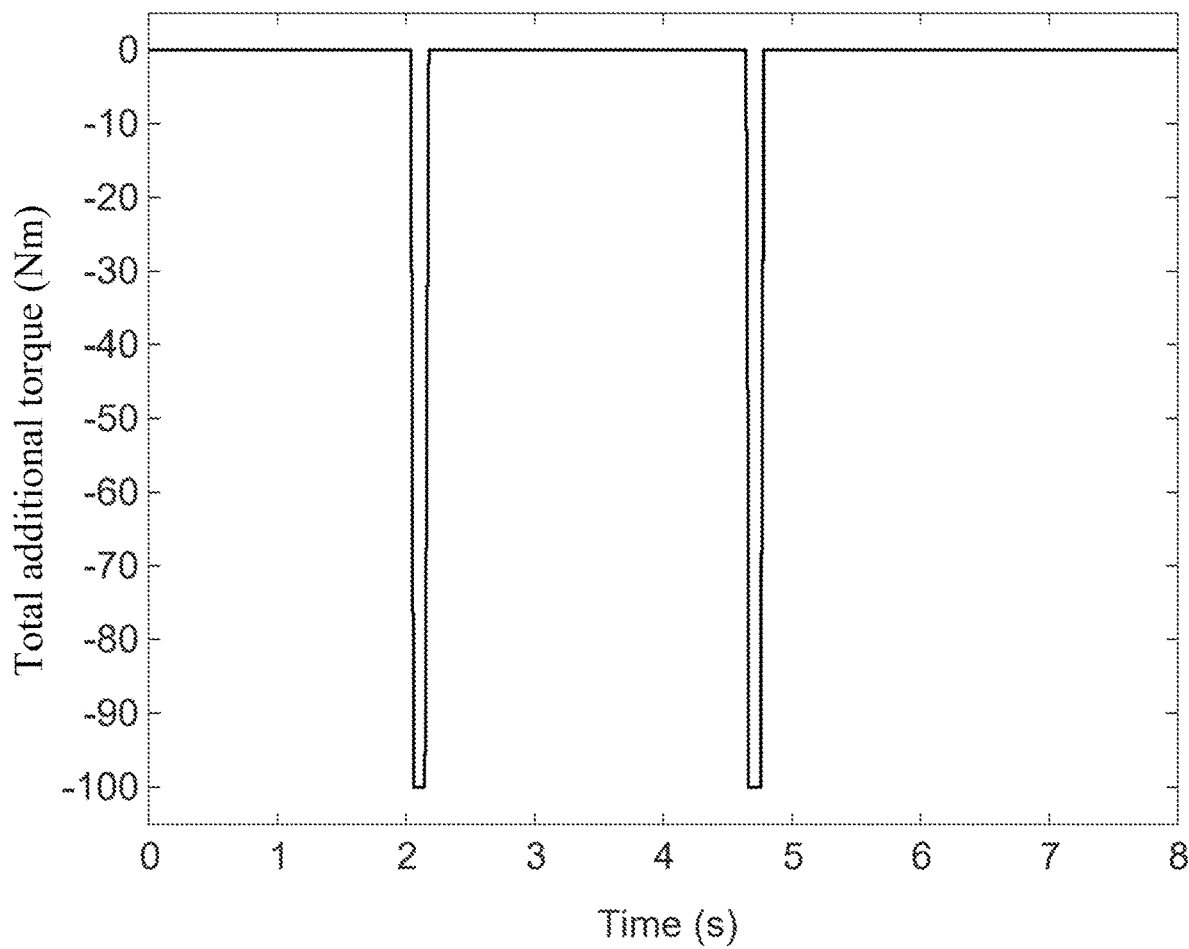
FIG. 6 is a schematic diagram of a total tire additional torque curve in a multi-constraint optimal distribution method for a torque vectoring of the present disclosure in a simulation process according to an embodiment of the present disclosure.

FIGS. 4, 5 and 6 shows a tire slip ratio curve, a tire additional torque curve and a total additional torque curve of the vehicle after the four-wheel additional torque determined through the multi-constraint optimal distribution method for a torque vectoring in the present disclosure is applied to the high-fidelity vehicle dynamics model. FL, FR, RL and RR represent a left front wheel, a right front wheel, a left rear wheel and a right rear wheel respectively. It can be found from analysis of the curves that under an effect of priority of the constraints, the four-wheel additional torque and the total four-wheel additional torque determined through the multi-constraint optimal distribution method for a torque vectoring can satisfy constraint requirements. Especially, as shown in FIG. 6, the total additional torque of four wheels is always limited in a constraint range of [−100 Nm, 0]. But correspondingly, at a limit of driving of the vehicle, such as 2.2nd s and 5th s, in order to guarantee that the four-wheel additional torque constraints and the total additional torque constraint of the four wheels satisfy the constraint requirements, the tire slip ratio is temporarily beyond a fixed constraint. At 2.2nd s, a peak of the tire slip ratio reaches 0.069, which is briefly beyond the given fixed slip ratio constraint of 0.04, but not beyond a slip ratio boundary of 0.09 after the slack variable is applied. Similarly, at 5th s, a peak of the slip ratio reaches 0.074, which is briefly beyond the given fixed slip ratio constraint of 0.04, but not beyond a slip ratio boundary of 0.09 after the slack variable is applied. This shows the effectiveness of the slack variable applied, and wrong solutions or no solution caused by over-constraint can be avoided by applying the slack variable.

Figure 7:
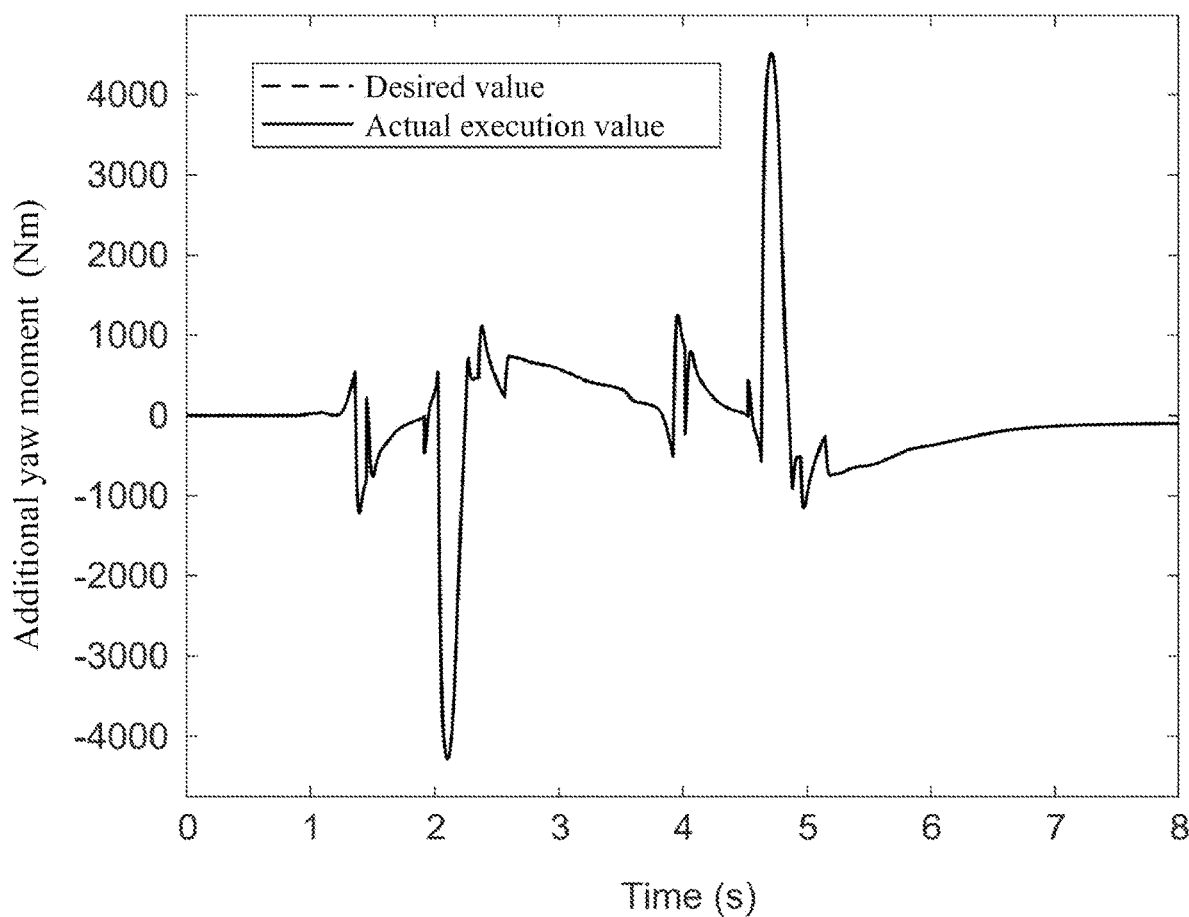
FIG. 7 is a schematic diagram of an additional yaw moment tracking curve in a four-wheel torque equal-distribution method in a simulation process according to an embodiment of the present disclosure.

In view of a comparative experiment made by using the four-wheel torque equal-distribution method in the simulation process, FIG. 7 shows an additional yaw moment tracking curve under the four-wheel torque equal-distribution method in a simulation process. It can be seen from analysis of FIG. 7 that an additional yaw moment obtained by the vehicle at this time can also track the desired additional yaw moment well.

Figure 8:
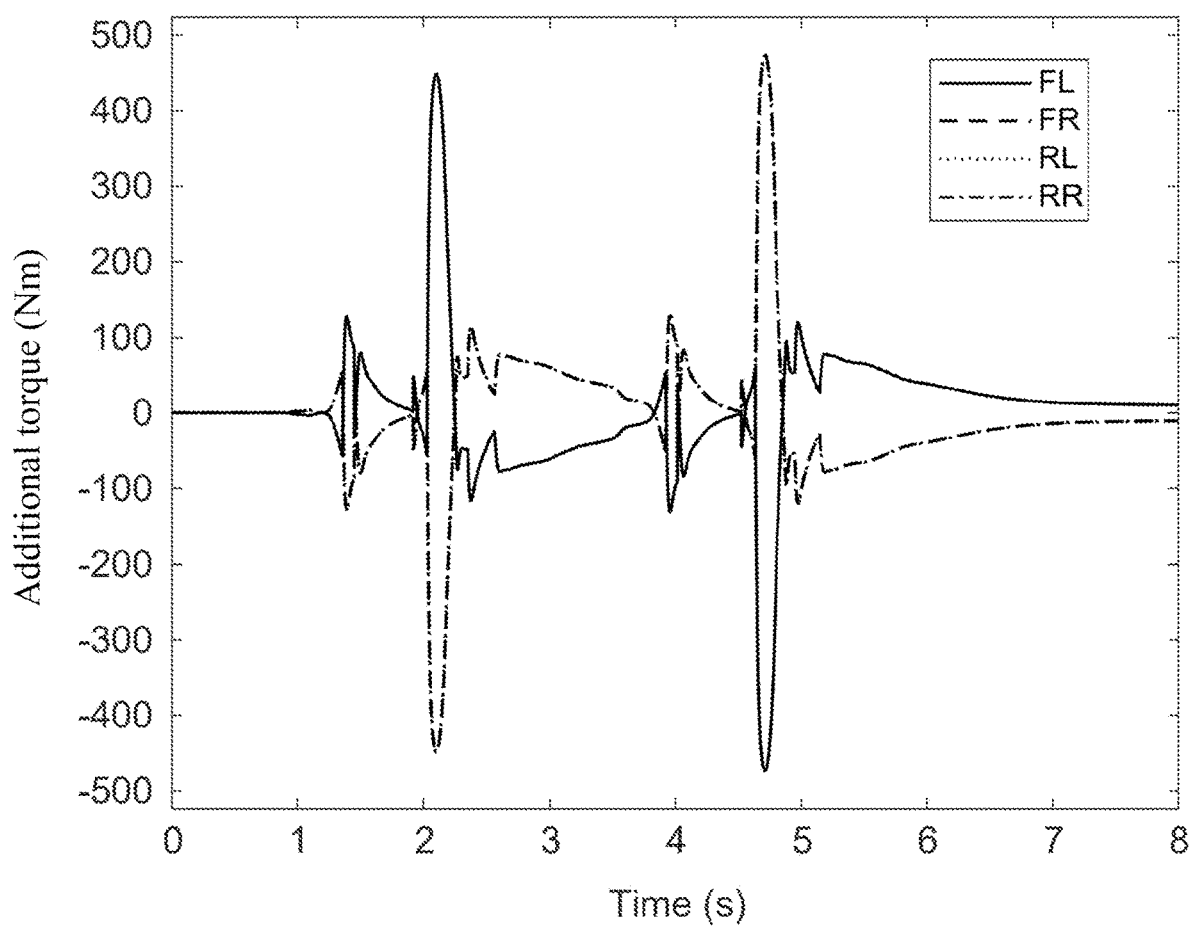
FIG. 8 is a schematic diagram of tire additional torque curves of four wheels in a four-wheel torque equal-distribution method in a simulation process according to an embodiment of the present disclosure.
Figure 9:
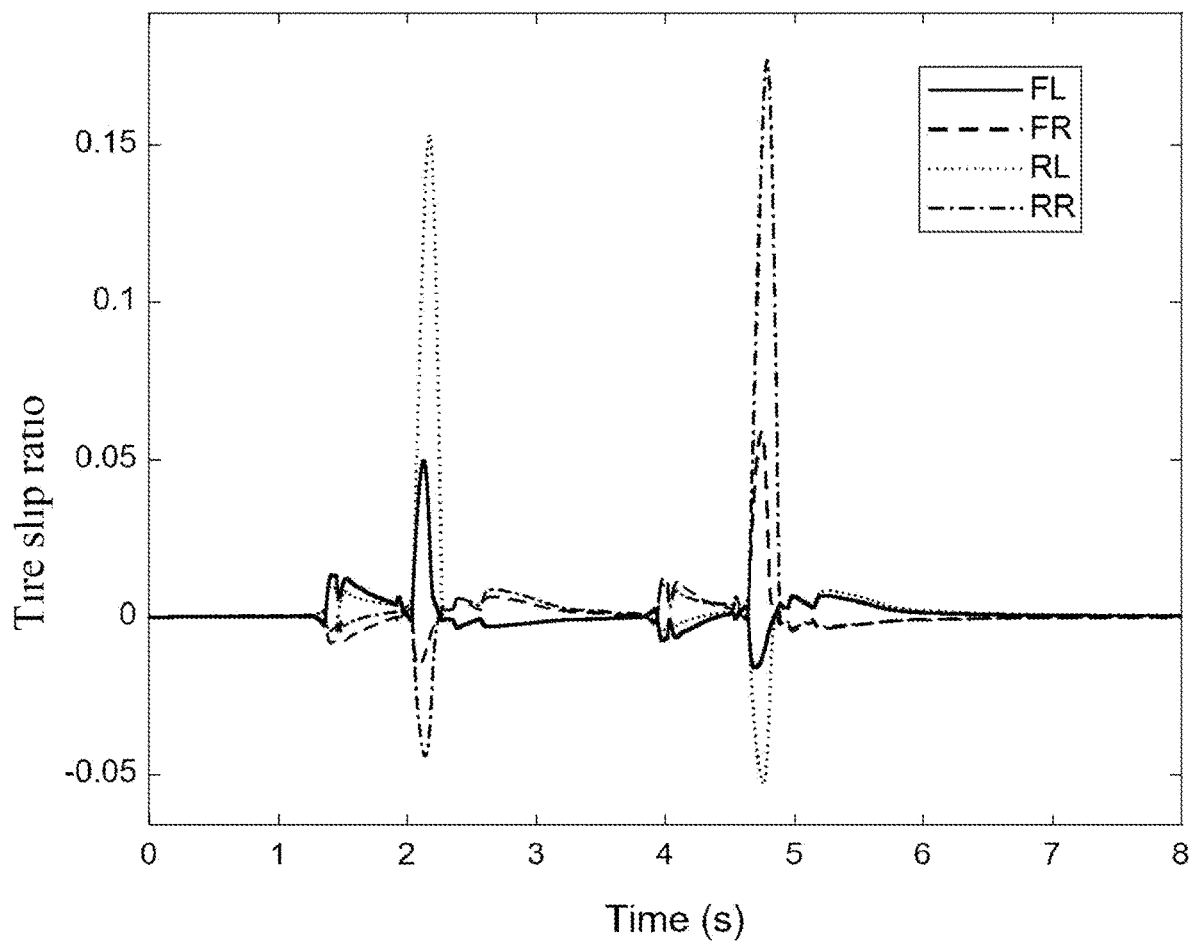
FIG. 9 is a schematic diagram of a tire slip ratio curve in a four-wheel torque equal-distribution method in a simulation process according to an embodiment of the present disclosure.

FIGS. 8 and 9 show a tire slip ratio curve and tire additional torque curves of the vehicle after the four-wheel additional torque determined through the four-wheel torque equal-distribution method is applied to the high-fidelity vehicle dynamics model in a simulation process. Since the equal-distribution method is used, the four-wheel additional torque curves in FIG. 8 are symmetrically distributed. Analysis of the tire slip ratio curve in FIG. 9 shows that a peak of the slip ratio reaches 0.175, where the tires are already in a slipping state, and tire adhesion is reduced, resulting in a decrease in maneuverability and driving stability of the vehicle.

Through simulation and comparison, the multi-constraint optimal distribution method for a torque vectoring in the present disclosure can effectively track a desired control target, and can also effectively constrain an important state and a control input of the vehicle. The priority of the constraints is graded by increasing the slack variable, such that wrong solutions or no solution caused by an optimization problem is avoided effectively.

The foregoing is detailed description of the preferred specific embodiments of the present disclosure. It should be understood that those of ordinary skill in the art can make various modifications and variations according to the concept of the present disclosure without creative efforts. Therefore, all technical solutions that those skilled in the art can obtain based on the prior art through logical analysis, reasoning, or finite experiments according to the concept of the present disclosure shall fall within the protection scope defined by the claims.

What is claimed is:

1. A controlling method for a distributed drive electric vehicle, comprising:
   obtaining a vehicle real-time motion state, taking a pre-constructed tire rotation dynamics model as a control object of an optimal distribution problem, establishing an objective function for tracking a desired additional yaw moment, tracking a desired tire slip ratio, and suppressing a motor output energy consumption to a minimum value, establishing a corresponding system constraint, solving the optimal distribution problem, and obtaining an optimal distribution solution for a torque vectoring of each tire,
   determining an additional torque of each wheel of the distributed drive electric vehicle according to the optimal distribution solution for a torque vectoring;
   controlling corresponding hub motor of the distributed drive electric vehicle according to the additional torque of each wheel of the vehicle;
   wherein the system constraint comprises a constraint limit on an important system state to make the important system state satisfy requirements of driving safety of the vehicle, and a constraint limit on a system control input to be optimized to avoid excessive interference caused by application of the control input with driving of the vehicle; wherein the constraint limit on an important system state comprises a slip ratio constraint, and the constraint limit on a system control input to be optimized comprises a tire additional torque constraint and a total additional torque constraint.

2. The controlling method for a distributed drive electric vehicle according to claim 1, wherein a calculation expression of the objective function is as follows:

$$J = J_1 + J_2 + J_3$$

$$J_1 = \sum_{i=1}^{n} \Phi_1 \|\Delta M_z(k+i-1) - \Delta M_z^*\|^2$$

$$\Delta M_z = \Omega(\Delta T_1, \Delta T_2, \Delta T_3, \Delta T_4)$$

$$J_2 = \sum_{i=1}^{n}\sum_{j=1}^{4} \Phi_2 \|\lambda_j(k+i-1) - \lambda_j^*(k+i-1)\|^2$$

$$\lambda_i = \Lambda(\omega_i, V_{xi}, R_e)$$

$$V_{xi} = h(V_x, V_y, \gamma, \delta_f, L_f, L_r, d)$$

$$J_3 = \sum_{i=1}^{n} \Phi_3 \|u(k+i-1)\|^2$$

wherein J is the objective function, $J_1$ is a function for tracking the desired additional yaw moment, $J_2$ is a function for tracking the desired tire slip ratio, $J_3$ is a function of the motor output energy consumption, $\Phi_1$ is a weight coefficient of the function $J_1$, $\Delta M_z^*$ is the desired additional yaw moment, $\Delta M_z$ is an actual additional yaw moment generated by a control input, $\Omega$ is a function relationship representation symbol, $\Delta T_1$, $\Delta T_2$, $\Delta T_3$, $\Delta T_4$ are tire additional torque of a left front wheel, a right front wheel, a left rear wheel, and a right rear wheel respectively, k is a current time, n is a predictive horizon, $\Phi_2$ is a weight coefficient of the function $J_2$, $\lambda^*$ is a desired slip ratio sequence, j is a tire number, $\Lambda$ is a function relationship representation symbol, $\omega_i$ is a tire rotation velocity at an i time, $V_{xi}$ is a longitudinal velocity at a center of each tire, $R_e$ is an effective rotation radius of each tire, V, is a longitudinal velocity of the vehicle, $V_y$ is a lateral velocity of the vehicle, $\gamma$ is a yaw rate of the vehicle, $\delta_f$ is a front wheel angle, $L_f$, $L_r$ are distances from a center of mass to a front axle and a rear axle respectively, d is a wheel track of the vehicle, h is a function relationship representation symbol, $\Phi_3$ is a weight coefficient of the function $J_3$, and u(k+i−1) is tire additional torque at a k+i−1 time.

3. The controlling method for a a distributed drive electric vehicle according to claim 1, wherein an expression of the slip ratio constraint is as follows:

$$\lambda_{low} \leq \lambda \leq \lambda_{up}$$

wherein $\lambda$ is a slip ratio vector, $\lambda_{low}$ is a lower limit value vector of a tire slip ratio, and $\lambda_{up}$ is an upper limit value vector of the tire slip ratio.

4. The controlling method for a a distributed drive electric vehicle according to claim 1, wherein an expression of the tire additional torque constraint is as follows:

$$u_{low} \leq u \leq u_{up}$$

wherein u is the tire additional torque, $u_{low}$ is a lower limit value of the tire additional torque, and $u_{up}$ is an upper limit value of the tire additional torque; and the total additional torque constraint is that total additional torque falls within a corresponding range from an upper limit to a lower limit.

5. The controlling method for a distributed drive electric vehicle according to claim 1, wherein in a process of solving the optimal distribution problem, priority of the constraint limit on a system control input to be optimized is set higher than priority of the constraint limit on an important system state.

6. The controlling method for a distributed drive electric vehicle according to claim 1, wherein in a process of solving the optimal distribution problem, the method further introduces a slack variable as an additional control input, and an expression of the slack variable is as follows:

$$\epsilon = [(\epsilon_1, \epsilon_2, \epsilon_3, \epsilon_4]^T$$

wherein $\epsilon$ is a slack variable sequence, and $\epsilon_1$, $\epsilon_2$, $\epsilon_3$, $\epsilon_4$ are slack variables of a left front wheel, a right front wheel, a left rear wheel and a right rear wheel respectively;

a slip ratio constraint is modified according to the slack variable, and an expression of a modified slip ratio constraint is as follows:

$$\lambda_{low} - \epsilon \leq \lambda \leq \lambda_{up} + \epsilon$$

wherein $\lambda$ is a slip ratio vector, $\lambda_{low}$ is a lower limit value vector of a tire slip ratio, and $\lambda_{up}$ is an upper limit value vector of the tire slip ratio; and a control input sequence obtained by solving the optimal distribution problem is as follows:

$$\bar{u} = [\Delta T_1, \Delta T_2, \Delta T_3, \Delta T_4, \epsilon_1, \epsilon_2, \epsilon_3, \epsilon_4]^T$$

wherein $\Delta T_1$, $\Delta T_2$, $\Delta T_3$, $\Delta T_4$ are tire additional torque of the left front wheel, the right front wheel, the left rear wheel and the right rear wheel respectively.

7. The controlling method for a distributed drive electric vehicle according to claim 6, wherein the slack variable corresponds to a slack variable constraint, and an expression of the slack variable constraint is as follows:

$$0 \leq \epsilon \leq \epsilon_{max}$$

wherein $\epsilon_{max}$ is an upper limit value of the slack variable.

8. The controlling method for a distributed drive electric vehicle according to claim 1, wherein an expression of the tire rotation dynamics model is as follows:

$$\dot{\omega}_i = \frac{1}{I_w}(-F_{xi}Re + T_i)$$

wherein subscripts i=1,2,3,4 represent a left front wheel, a right front wheel, a left rear wheel and a right rear wheel respectively; $\omega$ is a tire rotation velocity; T is total torque applied to the tires and is calculated as $T = T_d + \Delta T$, wherein $\Delta T$ is tire additional torque, and $T_d$ is a drive moment or a brake moment applied by a driver; $F_x$ is a tire longitudinal force, and $R_e$ is an effective rotation radius of each tire; and $I_\omega$ is a moment of inertia of the tire.

9. The controlling method for a distributed drive electric vehicle according to claim 1, wherein known quantities in a process of solving the optimal distribution problem comprise a front wheel angle, a drive moment or a brake moment applied by a driver, a desired additional yaw moment, and a desired tire slip ratio.

* * * * *